United States Patent

[11] 3,603,636

[72] Inventors Richard F. Carella
　　　　　　　　Mount Clemens;
　　　　　　　　James J. Johnson, Detroit, both of, Mich.
[21] Appl. No. 13,499
[22] Filed Feb. 24, 1970
[45] Patented Sept. 7, 1971
[73] Assignee General Motors Corporation
　　　　　　　　Detroit, Mich.

[54] MOUNTING ARRANGEMENT FOR A VEHICLE BODY ROOF PANEL
　　　4 Claims, 14 Drawing Figs.
[52] U.S. Cl. ..................................................... 296/137 B,
　　　　　　　　　　　　　　　　　　　　　　　　　　　　180/112
[51] Int. Cl. ..................................................... B60j 7/10
[50] Field of Search ........................................ 296/137 B,
　　　　　　　　　　　　　　　　137 R, 102; 180/111, 112, 113, 82

[56] References Cited
　　　　　UNITED STATES PATENTS
2,947,567   8/1960   Barenyi .................... 296/137 B
3,373,835   3/1968   Eatinger .................... 180/113

Primary Examiner—Leo Friaglia
Assistant Examiner—Robert R. Song
Attorneys—W. E. Finken and Herbert Furman ABSTRACT: A mounting arrangement for a vehicle body roof panel for closing a roof opening in a vehicle body. A pair of hinge assemblies pivotally support the roof panel on the body for movement between open and closed positions. Each hinge assembly includes a body mounted hinge member and a panel mounted hinge member which are locked to each other by a ball detent when the roof panel is in the closed position. When the roof panel is in the open position, each panel mounted hinge member is detachable from its respective body mounted hinge member and the roof panel is thus removable from the vehicle. A pair of latch assemblies include latch members pivotally supported on the roof panel for movement between latching positions and unlatching positions. When the latch members are in the latching positions, they are engageable with respective body mounted pins to retain the roof panel in the closed position. When the latch members are in the unlatching positions, the roof panel is free to move between the open and closed positions. The latch members are associated with respective sleeve detents movable between locking positions and unlocking positions. In the locking positions, the sleeve detents lock the latch members in the latching positions. A pair of release levers are pivotally supported on the roof panel and each is connected by a Bowden cable to each of the sleeve detents. Actuation of either of the release levers moves the sleeve detents to the unlocking positions. The latch members are also associated with respective pin detents located within the sleeve detents and movable between locking positions and unlocking positions. When the sleeve detents are in the unlocking positions and the pin detents are in the locking positions, the pin detents lock the latch members in the latching positions. A pair of solenoids are mounted on the roof panel and respectively connected to the pin detents to move the pin detents from the locking positions to the unlocking positions. The solenoids are responsive to actuation of either of the release levers and to the position of a transmission selector lever such that actuation of either of the release levers when the transmission selector lever is in a "park" position causes the solenoids to move the pin detents to the unlocking positions. When the sleeve detents and the pin detents are in the unlocking positions, the latch members are free to move to the unlatching positions and the roof panel is free to move between the open and closed positions.

PATENTED SEP 7 1971

INVENTORS
Richard F. Carella &
BY James J. Johnson

Herbert Furman
ATTORNEY

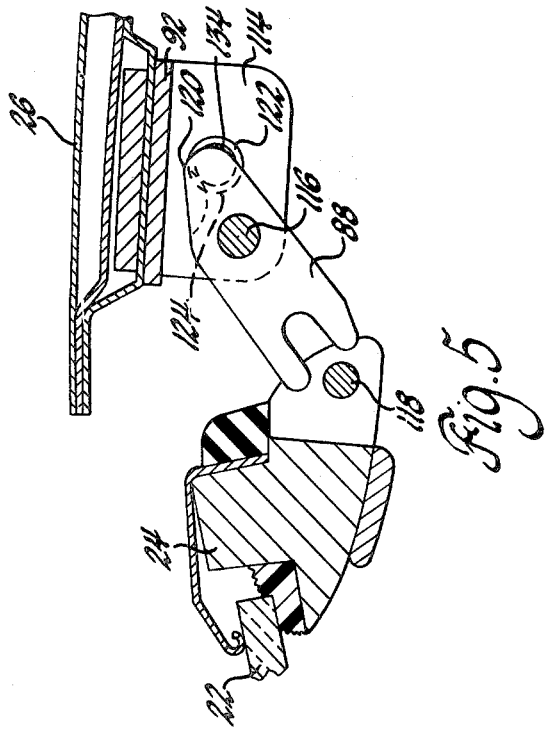
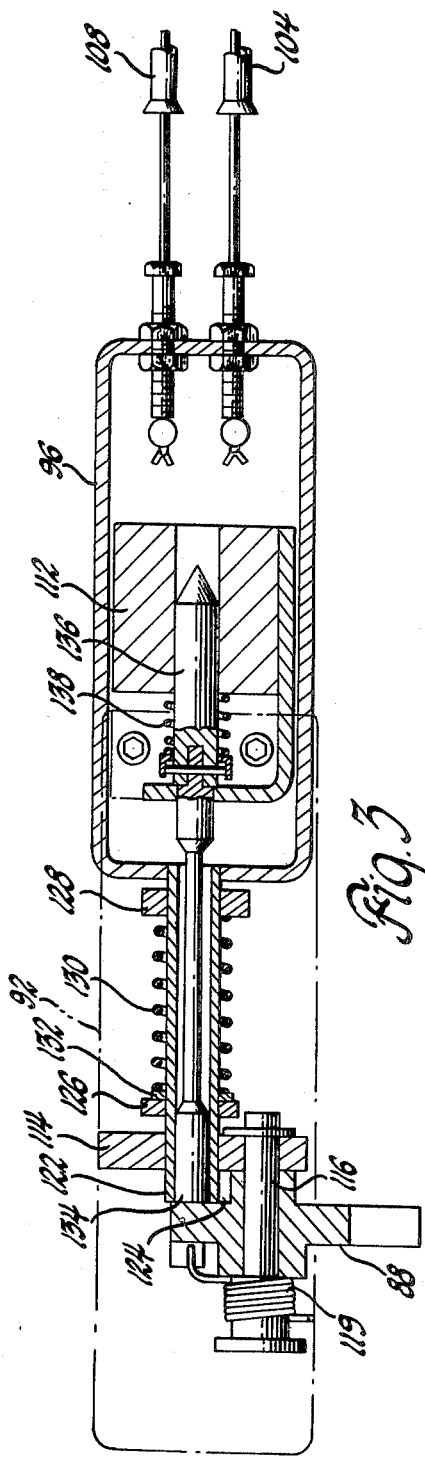
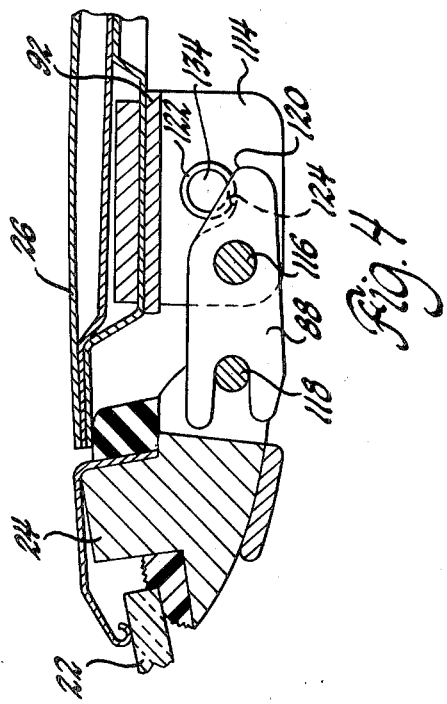

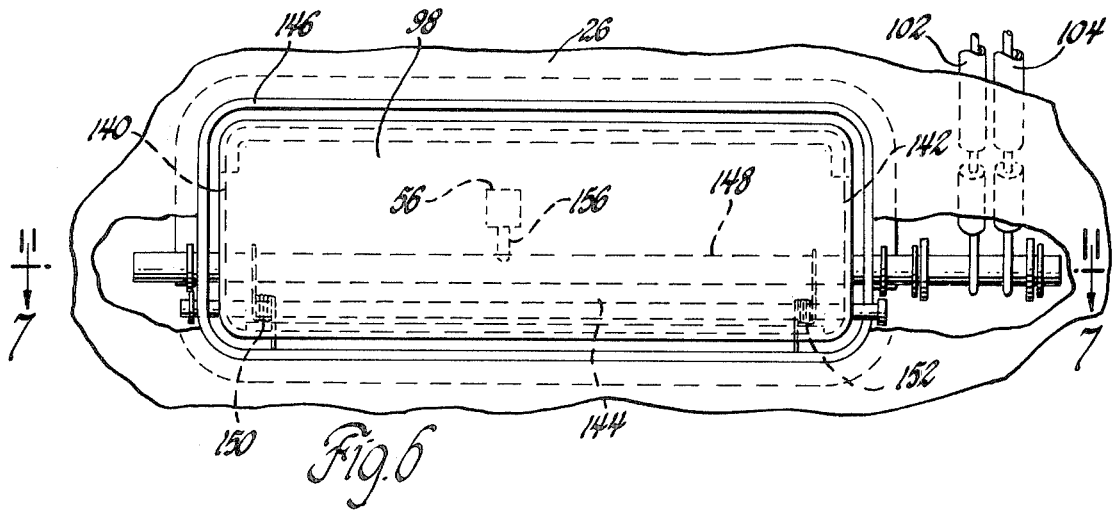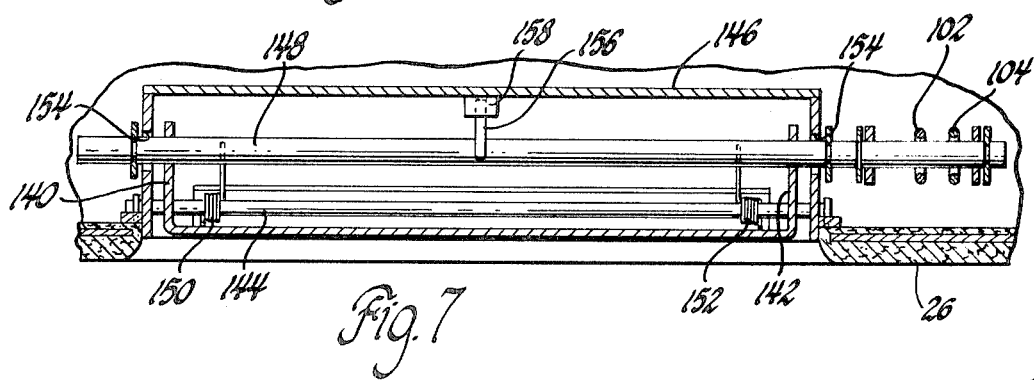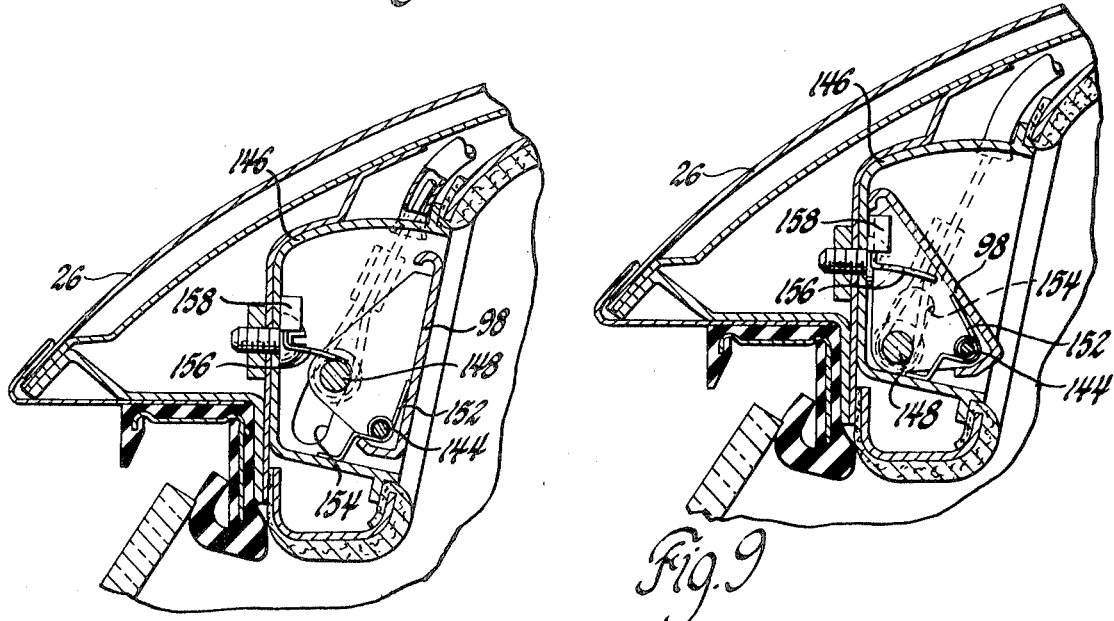

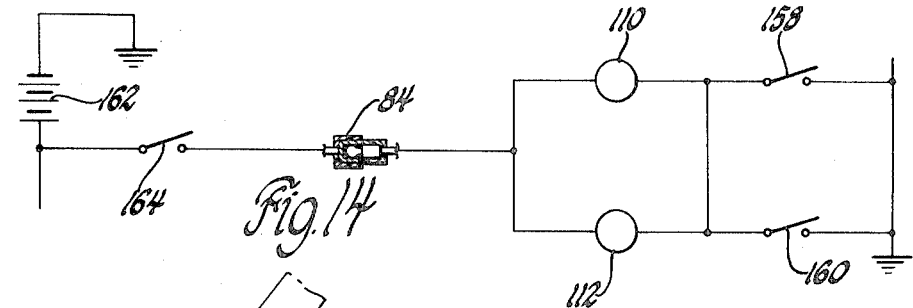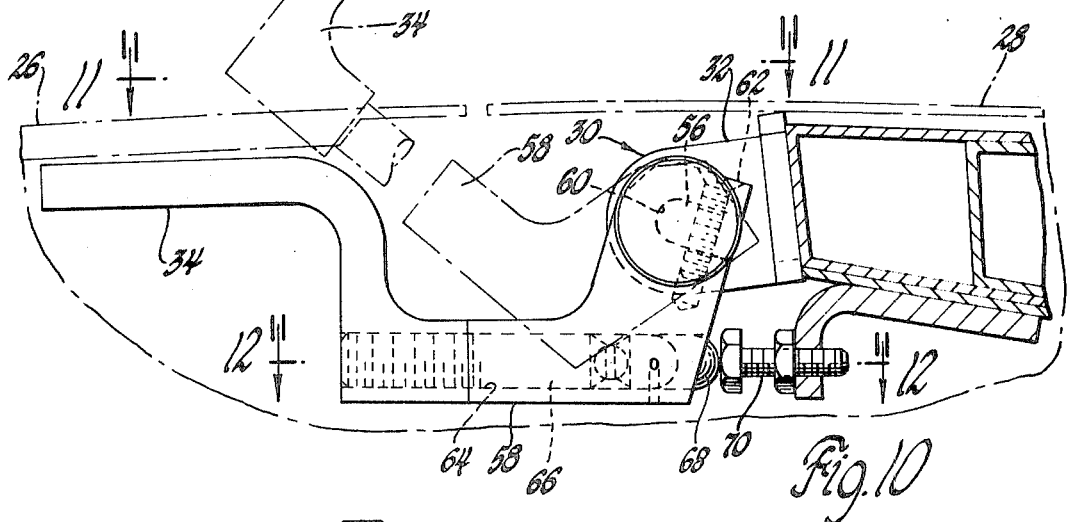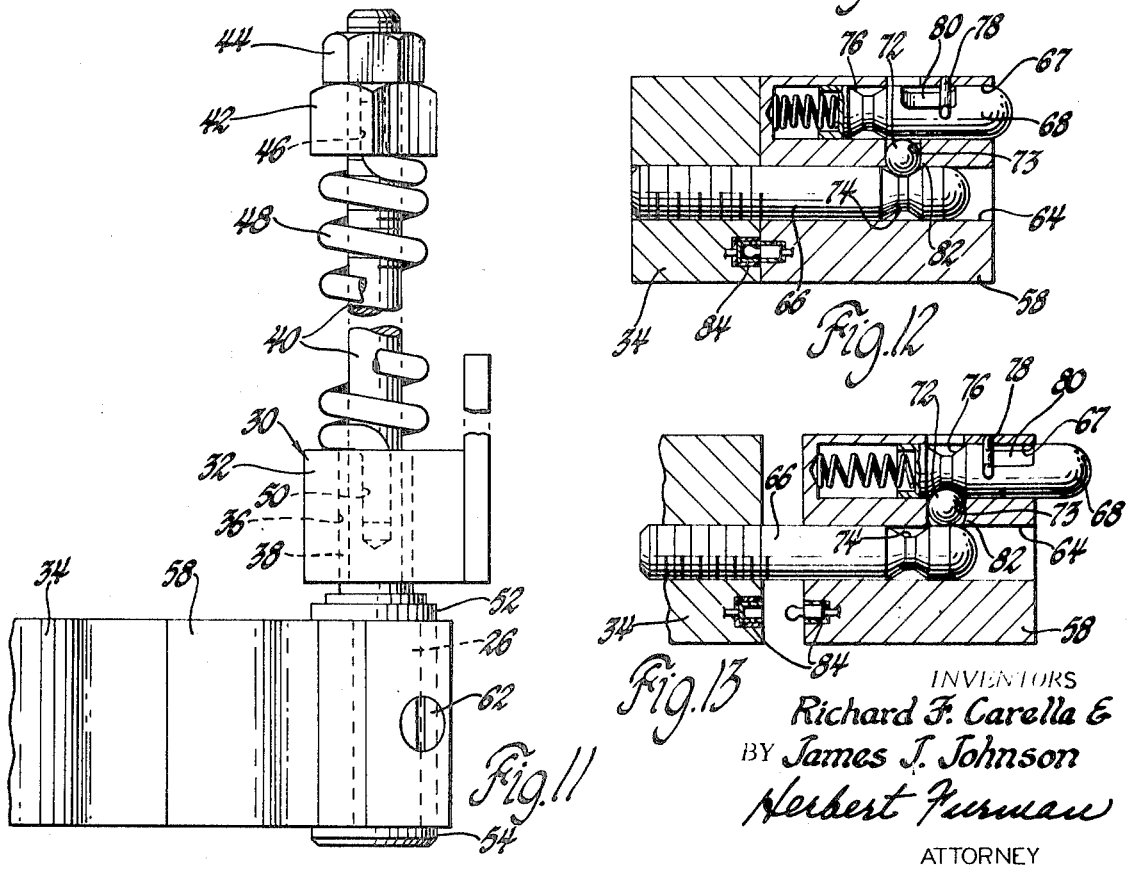

MOUNTING ARRANGEMENT FOR A VEHICLE BODY ROOF PANEL

This invention relates to a mounting arrangement for a vehicle body roof panel.

It is well known for vehicles to include roof panel openings and roof panels for closing the openings to provide convertiblelike vehicles. Conventionally, these roof panels are removable from the vehicle or pivotally mounted for movement between open and closed positions. This invention provides a mounting arrangement for a roof panel wherein hinge assemblies support the roof panel on the body for movement between an open position in which the roof panel is removable from the vehicle and a closed position wherein latch assemblies and the hinge assemblies cooperate to retain the roof panel in closed position during operation of the vehicle.

One feature of this invention is that it provides a mounting arrangement for a vehicle body roof panel wherein hinge assemblies pivotally mount the roof panel on the body for movement between a closed position and an open position in which the roof panel is removable from the vehicle. Another feature of this invention is that the hinge assemblies cooperate with latch assemblies to retain the roof panel in closed position during operation of the vehicle.

In the drawing:

FIG. 3 is an enlarged view of the left-hand latch assembly;

FIG. 4 is a sectional view of the windshield header and the roof panel in closed position and showing the left-hand latch member in a latching position;

FIG. 5 is a view similar to FIG. 4 with the roof panel slightly ajar and with the left-hand latch member in an unlatching position;

FIG. 6 is an enlarged view of a portion of the right-hand side of the roof panel showing the right-hand release lever;

FIG. 7 is a sectional view taken generally along line 7—7 of FIG. 6;

FIG. 8 is a sectional view of the right-hand side window and the right-hand side of the roof panel showing the right-hand release lever in an unactuated position;

FIG. 9 is a view similar to FIG. 8 with the right-hand release lever in an actuated position;

FIG. 10 is a side view of a right-hand hinge assembly;

FIG. 11 is a view taken along line 11—11 of FIG. 10;

FIG. 12 is a sectional view taken along line 12—12 of FIG. 10 and showing the hinge members locked to each other by a ball detent;

FIG. 13 is a sectional view similar to FIG. 12 in which the ball detent has released the hinge members from each other to allow removal of the roof panel from the vehicle; and FIG. 14 is an electrical circuit diagram.

Figure 1:
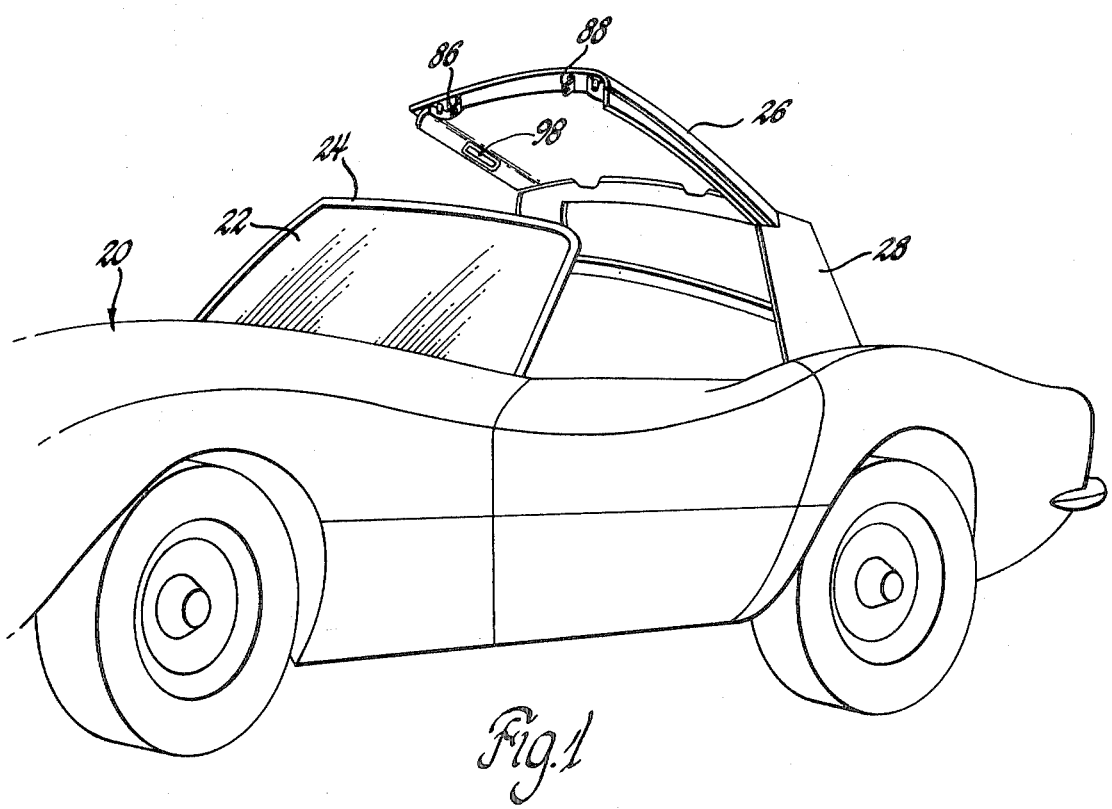
FIG. 1 is a partial perspective view of a vehicle including a mounting arrangement for a vehicle body roof panel according to the invention with the roof panel shown in an open position.

Referring to FIG. 1, a vehicle generally indicated at 20 includes a windshield 22 and a windshield header 24. Laterally spaced hinge assemblies pivotally mount a roof panel 26 on a rear roof portion 28 for movement between an open position, as shown, and a closed position, in which the roof panel 26 is engageable with the windshield header 24 as will be hereinafter described.

Referring to FIGS. 10 and 11, a right-hand hinge assembly 30 and a symmetrical left-hand hinge assembly, not shown, pivotally support the roof panel 26 on the rear roof portion 28. The hinge assembly 30 includes a body mounted hinge member 32 conventionally secured to the rear roof portion 28 and a panel mounted hinge member 34 conventionally secured to the roof panel 26. The body mounted hinge member 32 has an aperture 36 which receives a bushing 38 that supports a rod 40. One end of rod 40 receives first and second nuts 42 and 44. The nut 42 has an aperture 46 that receives one end of a helical spring 48, the other end of which is received within an aperture 50 in the body mounted hinge member 32. The other end of rod 40 includes annular lugs 52 and 54 integrally connected by a web 56. The by 52 and 54 support a hinge detent member 58 which includes a slot 60 that accepts the web 56. A setscrew 62 retains web 56 in slot 60. The spring 48 biases the rod 40 in a positive right-hand direction as viewed in FIG. 11 or clockwise as viewed in FIG. 10 to bias the hinge assembly 30 from the solid line closed position to the phantom line open position.

Referring to FIGS. 12 and 13, the hinge detent member 58 has a longitudinal bore 64 which slidably receives a pin 66 that is threadably mounted in the panel mounted hinge member 34. The hinge detent member 58 also has a closed end bore 67 parallel to bore 64 and receiving a plunger 68 that is spring biased outwardly of member 58. When the hinge assembly 30 moves to the closed position, plunger 68 abuts a conventional body mounted adjustable stop 70, as in FIG. 10, and moves to a depressed position shown in FIG. 12. When the hinge assembly 30 moves to the open position, the plunger 68 moves to an extended position shown in FIG. 13. Movement of the plunger 68 controls a ball detent 72 that is carried within a detent bore 73 that connects bores 64 and 67. When the plunger 68 moves to the depressed position, the ball detent 72 moves to a position within bore 73 such that an annular groove 74 in the pin 66 receives the ball detent 72 and locks the panel mounted hinge member 34 to the hinge detent member 58 and consequently to the body mounted hinge member 32. When the plunger 68 moves to the extended position, an annular groove 76 in plunger 68 aligns with bore 73. If pin 66 is then withdrawn from bore 64, the ball detent 72 will move within bore 73 to a position within groove 76 in plunger 68. Withdrawal of the pin 66 is thus concomitant with the release of the panel mounted hinge member 34 from the hinge detent member 58 and removal of the roof panel 26 from the vehicle 20.

It will be noted that a pin 78 mounted on the hinge detent member 58 cooperates with a groove 80 in the plunger 68 to limit the movement of plunger 68 within bore 67. This prevents the plunger 68 from moving past the extended position shown in FIG. 13 and possible loss thereof. Hinge detent member 58 has an annular rib 82 that slightly reduces the diameter of bore 73 at the end thereof adjacent bore 64. The diameter of rib 82 is large enough to allow ball detent 72 to be received within groove 74 in pin 66; however, the diameter of rib 82 is small enough to retain ball detent 72 within bore 73 and prevent possible loss thereof. It will also be noted that a jack assembly 84 mounted on the hinge detent member 58 and the panel mounted hinge member 34 supplies an electrical connection to the roof panel 26 when the members 34 and 58 are locked to each other as shown in FIG. 12. While the left-hand hinge assembly is symmetrical to the right-hand hinge assembly 30, it is not necessary for the left-hand hinge assembly to include a jack assembly as a connection to ground is sufficient.

Figure 2:
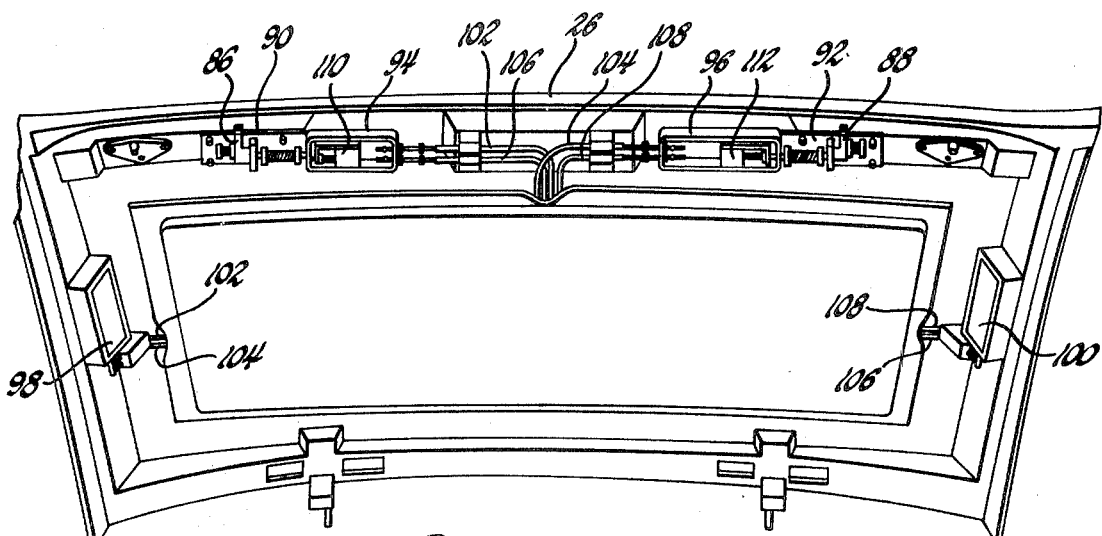
FIG. 2 is a bottom perspective view of the roof panel removed from the vehicle and with the inner panel of the roof panel removed to reveal the latch assemblies.

Referring to FIG. 2, right- and left-hand latch members 86 and 88 are pivotally supported on the roof panel 26 by right- and left-hand plates 90 and 92 which are conventionally attached to the roof panel 26. The latch members 86 and 88 are controlled by sleeve and pin detents as will be hereinafter described. Associated with the plates 90 and 92 are right- and left-hand release brackets 94 and 96, respectively, whose function in controlling movement of latch members 86 and 88 will be hereinafter described. The roof panel 26 also supports right- and left-hand manual release levers 98 and 100. Conventional Bowden cables 102 and 104 connect release lever 98 to the release brackets 94 and 96, respectively. Likewise, Bowden cables 106 and 108 connect the release lever 100 to the release brackets 94 and 96, respectively. Right- and left-hand solenoids 110 and 112 are mounted on plates 90 and 92 by conventional mounting means and the operation thereof will be hereinafter described.

FIGS. 3, 4, and 5 show enlarged views of the left-hand latch member 88 and illustrate the function thereof. The right-hand latch member 86 functions in a similar manner but of opposite hand and will not be described.

As best seen in FIG. 3, the plate 92 includes an upstanding lug 114 which carries a pin 116. The pin 116 pivotally supports the latch member 88 for movement between a latching position as shown in FIG. 4 and an unlatching position as shown in FIG. 5. In the latching position, the latch member 88 is engageable with a pin 118 conventionally mounted on the windshield header 24 and the roof panel 26 is thus retained in the closed position. When the latch member 88 is in the unlatching position, the roof panel 26 is free to move between open and closed positions. A torsion spring 119 carried on the pin 116 biases the latch member 88 to the unlatching position such that edge 120 of the latch member 88 is engageable with a suitable stop, not shown, mounted on the plate 92. The latch member 88 includes a cutaway portion that provides a shoulder 124. In the latching position, the free end of a sleeve detent 122 engages the shoulder 124 to block movement of latch member 88 toward the unlatching position. The sleeve detent 122 is slidably mounted on the plate 92 by aligned apertures in lug 114 and in lugs 126 and 128. A spring 130 is concentrically positioned about the sleeve detent 122 between the lugs 126 and 128. One end of the spring 130 abuts lug 128 and the other end abuts a washer 132 attached to sleeve detent 122. The spring 130 biases the washer 132 into engagement with lug 126 to bias the sleeve detent 122 to a locking position as shown in FIG. 3. The release bracket 96 is attached to the other end of the sleeve detent 122. Actuation of either of the release levers 98 or 100 causes Bowden cable 104 or 108 respectively to move the release bracket 96 and the sleeve detent 122 to an unlocking position to the right of the locking position shown in FIG. 3. When the sleeve detent 122 is in the unlocking position, the free end thereof is out of engagement with the shoulder 124 of latch member 88.

A pin detent 134 is concentrically positioned within the sleeve detent 122. Upon movement of the sleeve detent 122 to the unlocking position, the latch member 88 will move slightly toward the unlatching position and shoulder 124 will then abut the pin detent 134 if the detent 134 is in the locking position shown in FIG. 3. The latch member 88 will thus still be retained substantially in the latching position and will retain the roof panel in the closed position. The solenoid 112 has an armature 136 that is attached to the pin detent 134. The solenoid 112 also has a spring 138 which biases the armature 136 and the pin detent 134 to the left to the locking position shown in FIG. 3. Actuation of the solenoid 112 moves the pin detent 134 to an unlocking position to the right of the locking position shown in FIG. 3. If this movement occurs prior to or simultaneous with the movement of the sleeve detent 122 to the unlocking position, the shoulder 124 of latch member 88 will not abut pin detent 134 and the spring 119 will not exert any force on pin detent 134. The solenoid 112 will thus require very little force to move the pin detent 134. When both the sleeve detent 122 and the pin detent 134 are in their respective unlocking positions, spring 119 moves the latch member 88 to the unlatching position and the roof panel is free to move between the open and closed positions.

FIGS. 6 through 9 show the right-hand release lever 98 which functions to actuate cables 102 and 104 in the same manner as the left-hand release lever 100 functions to actuate cables 106 and 108 but of opposite hand. Release lever 98 includes ears 140 and 142 which have apertures receiving a support rod 144 that pivotally supports the release lever 98 in a housing 146 mounted in roof panel 26. The ears 140 and 142 also have apertures which receive a release rod 148 to which is attached Bowden cables 102 and 104. Release rod 148 extends through slots 154 in housing 146 to limit movement of the release lever 98 between an unactuated position shown in FIG. 8 and an actuated position shown in FIG. 9. Springs 150 and 152 bias the release lever 98 toward the unactuated position. Movement of the release lever 98 toward the actuated position causes the release rod 148 to actuate Bowden cables 102 and 104. Upon initial movement of the release lever 98, the release rod 148 releases a leg 156 of a normally closed microswitch 158 to allow the switch to close. Actuation of release lever 100 has the same effect on a similar switch 160, not shown.

Referring now to FIG. 14, a source of power 162 has a first side connected to ground and a second side connected to the first side of a switch 164. Switch 164 has an open position and a closed position and is responsive to the position of a transmission selector lever so that the switch 164 is in the closed position when the transmission selector lever is in the "park" position and is in the open position at all other times. The jack assembly 84 connects the second side of switch 164 to the first sides of solenoids 110 and 112 which are in parallel. The second sides of the solenoids 110 and 112 are connected to each other and to the first sides of switches 158 and 160. The second sides of switches 158 and 160 are connected to each other and to ground. When either release lever 98 or 100 is actuated, switch 158 or 160 will be closed to thus actuate the solenoids 110 and 112 if the transmission selector lever is in the "park" position.

From the foregoing, it is clear that actuation of either of the release levers will move the sleeve detents to unlocking positions but that the pin detents will remain in locking positions if the transmission selector lever is not in the "park" position. The pin detents will thus retain the latch members in latching position and consequently the roof panel in closed position during operation of the vehicle. It is also clear that the hinge assemblies will cooperate with the latch members to retain the roof panel in the closed position and allow removal of the roof panel in the open position.

What is claimed is:

1. In a vehicle including a body having a roof panel opening therein and a roof panel for closing the opening, a mounting arrangement comprising: hinge means pivotally supporting the roof panel on the body for movement between open and closed positions; latch means operable between the roof panel and the body and movable between a latching position and an unlatching position, said latch means retaining the roof panel in the closed position when said latch means is in the latching position, said latch means allowing the roof panel to move between the open and closed positions when said latch means is in the unlatching position; a first latch detent movable between a locking position and an unlocking position, said first latch detent locking the latch means in the latching position when the first latch detent is in the locking position to thereby retain the roof panel in the closed position; a first release means connected to the first latch detent to move the first latch detent from the locking position to the unlocking position upon actuation of the first release means; a second latch detent movable between a locking position and an unlocking position, said second latch detent locking the latch means in the latching position when the second latch detent is in the locking position and the first latch detent is in the unlocking position to thereby retain the roof panel in the closed position; and a second release means connected to the second latch detent to move the second latch detent from the locking position to the unlocking position, said second release means being responsive to actuation of the first release means only during nonoperation of the vehicle to move the second latch detent to the unlocking position only during nonoperation of the vehicle so that the roof panel remains in the closed position during operation of the vehicle.

2. In a vehicle including a body having a roof panel opening therein and a roof panel for closing the opening, a mounting arrangement comprising: hinge means including a body mounted hinge member and a panel mounted hinge member, said hinge means pivotally supporting the roof panel on the body for movement between open and closed positions; a hinge detent locking the hinge members to each other when the roof panel is in the closed position and releasing the hinge members from each other when the roof panel is in the open position to allow removal of the roof panel from the vehicle;

latch means operable between the roof panel and the body and movable between a latching position and an unlatching position, said latch means retaining the roof panel in the closed position when said latch means is in the latching position, said latch means allowing the roof panel to move between the open and closed positions when said latch means is in the unlatching position; a first latch detent movable between a locking position and an unlocking position, said first latch detent locking the latch means in the latching position when the first latch detent is in the locking position to thereby retain the roof panel in the closed position; a first release means connected to the first latch detent to move the first latch detent from the locking position to the unlocking position upon actuation of the first release means; a second latch detent movable between a locking position and an unlocking position, said second latch detent locking the latch means in the latching position when the second latch detent is in the locking position and the first latch detent is in the unlocking position to thereby retain the roof panel in the closed position; and a second release means connected to the second latch detent to move the second latch detent from the locking position to the unlocking position, said second release means being responsive to actuation of the first release means only during nonoperation of the vehicle to move the second latch detent to the unlocking position only during nonoperation of the vehicle so that the roof panel remains in the closed position during operation of the vehicle.

3. In a vehicle including a body having a roof panel opening therein and a roof panel for closing the opening, a mounting arrangement comprising: hinge means pivotally supporting the roof panel on the body for movement between open and closed positions; latch means operable between the roof panel and the body and movable between a latching position and an unlatching position, said latch means retaining the roof panel in the closed position when said latch means is in the latching position, said latch means allowing the roof panel to move between the open and closed positions when said latch means is in the unlatching position; a sleeve detent axially movable between a locking position and an unlocking position, said sleeve detent locking the latch means in the latching position when the sleeve detent is in the locking position to thereby retain the roof panel in the closed position; a manually actuated release means connected to the sleeve detent to move the sleeve detent from the locking position to the unlocking position upon manual actuation of the release means; a pin detent located within the sleeve detent in a relationship concentric therewith, said pin detent being axially movable between a locking position and an unlocking position, said pin detent locking the latch means in the latching position when the pin detent is in the locking position and the sleeve detent is in the unlocking position to thereby retain the roof panel in the closed position; and an electromechanical release means connected to the pin detent to move the pin detent from the locking position to the unlocking position, said electromechanical release means being responsive to actuation of the manually actuated release means only during nonoperation of the vehicle to move the pin detent to the unlocking position only during nonoperation of the vehicle so that the roof panel remains in the closed position during operation of the vehicle.

4. In a vehicle including a body having a roof panel opening therein and a roof panel for closing the opening, a mounting arrangement comprising: hinge means pivotally supporting the roof panel on the body for movement between open and closed positions; a latch member pivotally supported on the roof panel for movement between latching position and an unlatching position, said latch member being operatively associated with the body to retain the roof panel in the closed position when the latch member is in a latching latching position and to allow the roof panel to move between the open and closed positions when the latch member is in the unlatching position; a sleeve detent slidably mounted on the roof panel and axially movable between a locking position and an unlocking position, a said sleeve detent locking the latch member in the latching position when the sleeve detent is in the locking position to thereby retain the roof panel in the closed position; a manually actuated release means connected to the sleeve detent to move the sleeve detent from the locking position to the unlocking position upon manual actuation of the release means; a pin detent located within the sleeve detent, said pin detent being axially movable between a locking position and an unlocking position, said pin detent locking the latch member in the latching position when the pin detent is in the locking position and the sleeve detent is in the unlocking position to thereby retain the roof panel in the closed position; and an electromechanical release means connected to the pin detent to move the pin detent from the locking position to the unlocking position, said electromechanical release means being responsive to actuation of the manually actuated release means only during nonoperation of the vehicle to move the pin detent to the unlocking position only during nonoperation of the vehicle so that the roof panel remains in the closed position during operation of the vehicle.